US011955000B2

(12) United States Patent
Vanderkam et al.

(10) Patent No.: US 11,955,000 B2
(45) Date of Patent: Apr. 9, 2024

(54) METHODS, SYSTEMS, AND MEDIA FOR GENERATING AND EVALUATING STREET GRIDS

(71) Applicant: Google LLC, Mountain View, CA (US)

(72) Inventors: Dan Vanderkam, Brooklyn, NY (US); Douwe Osinga, New York, NY (US); Violet Whitney, Long Island City, NY (US); Kabir Soorya, Long Island City, NY (US); Jack Amadeo, Brooklyn, NY (US); Difei Chen, New York, NY (US); Brian Ho, New York, NY (US); Okalo Ikhena, New York, NY (US); Amanda Meurer, Brooklyn, NY (US); Samara Trilling, New York, NY (US)

(73) Assignee: Google LLC, Mountain View, CA (US)

( * ) Notice: Subject to any disclaimer, the term of this patent is extended or adjusted under 35 U.S.C. 154(b) by 417 days.

(21) Appl. No.: 16/951,881

(22) Filed: Nov. 18, 2020

(65) Prior Publication Data

US 2021/0150888 A1 May 20, 2021

Related U.S. Application Data

(60) Provisional application No. 62/936,890, filed on Nov. 18, 2019.

(51) Int. Cl.
*G08G 1/01* (2006.01)

(52) U.S. Cl.
CPC ......... *G08G 1/0112* (2013.01); *G08G 1/0129* (2013.01); *G08G 1/0133* (2013.01); *G08G 1/0141* (2013.01)

(58) Field of Classification Search
CPC .. G08G 1/0112; G08G 1/0129; G08G 1/0133; G08G 1/0141
See application file for complete search history.

(56) References Cited

U.S. PATENT DOCUMENTS 10,969,789 B2 * 4/2021 Refaat ............... B60W 50/0097
2016/0104377 A1 4/2016 French et al.
2019/0113920 A1 4/2019 Englard et al.

FOREIGN PATENT DOCUMENTS

WO WO 2017176550 10/2017

OTHER PUBLICATIONS

International Search Report and Written Opinion dated Feb. 10, 2021 in International Patent Application No. PCT/US2020/061097, pp. 1-17.

* cited by examiner

*Primary Examiner* — James M McPherson
*Assistant Examiner* — Bakari Underwood
(74) *Attorney, Agent, or Firm* — Lerner David LLP

(57) ABSTRACT

Methods, systems, and media for generating and evaluating street grids comprising: receiving street grid information corresponding to a plurality of locations, wherein the street grid information corresponding to a location is associated with vehicular traffic information; training a pedestrian comfort model using the street grid information and the vehicular traffic information, wherein an output of the pedestrian comfort model is a predicted pedestrian comfort score that is based on traffic congestion from the vehicular traffic information; receiving a plurality of potential street grids; evaluating each potential street grid in the plurality of potential street grids using the trained pedestrian comfort model, wherein the trained pedestrian comfort model generates predicted pedestrian comfort scores for portions of each potential street grid; and generating an augmented map of each potential street grid that presents the predicted pedestrian comfort scores for each portion of each potential street grid.

21 Claims, 3 Drawing Sheets

METHODS, SYSTEMS, AND MEDIA FOR GENERATING AND EVALUATING STREET GRIDS

CROSS-REFERENCE TO RELATED APPLICATIONS

This application claims the benefit of U.S. Provisional Patent Application No. 62/936,890, filed Nov. 18, 2019, which is hereby incorporated by reference herein in its entirety.

TECHNICAL FIELD

The disclosed subject matter relates to methods, systems, and media for generating and evaluating street grids.

BACKGROUND

When designing or modifying a city, town, or other geographic location, it may be useful to generate a street grid for the location. For example, it may be useful to generate or design a layout of streets and roads within the location. Many streets and roads are used by both vehicles (e.g., cars, trucks, bicycles, etc.) and pedestrians who walk on sidewalks along the street or road. However, there can be tradeoffs between the desires of vehicle users and the desires of pedestrians. For example, a person in a vehicle may prefer to travel on a long, straight road at a high speed given the speed limit of that road. Conversely, a pedestrian may prefer to walk on a winding path having multiple turns, where the turns may break up prevailing winds, which can, in turn, lead to more pedestrian comfort. In some instances, a pedestrian may even prefer to walk on a winding road where traffic is moving more slowly, for example, to reduce wind gusts that are created from passing cars and trucks, to reduce a chance of being hit by a passing car, etc. However, it can be difficult to design a street grid for a particular location that considers the many tradeoffs between vehicles and pedestrians.

Accordingly, it is desirable to provide new methods, systems, and media for generating and evaluating street grids.

SUMMARY

Methods, systems, and media for generating and evaluating street grids are provided.

In accordance with some embodiments of the disclosed subject matter, a method for generating and evaluating street grids is provided, the method comprising: receiving, using a hardware processor, street grid information corresponding to a plurality of locations, wherein the street grid information corresponding to a location in the plurality of locations is associated with vehicular traffic information; training, using the hardware processor, a pedestrian comfort model using the street grid information and the vehicular traffic information from each of the plurality of locations, wherein an output of the pedestrian comfort model is a predicted pedestrian comfort score that is based on traffic congestion from the vehicular traffic information; receiving, using the hardware processor, a plurality of potential street grids; evaluating, using the hardware processor, each potential street grid in the plurality of potential street grids using the trained pedestrian comfort model, wherein the trained pedestrian comfort model generates predicted pedestrian comfort scores for portions of each potential street grid; and generating, using the hardware processor, an augmented map of each potential street grid that presents the predicted pedestrian comfort scores for each portion of each potential street grid.

In some embodiments, the street grid information corresponds with a street grid layout and the associated vehicular traffic information includes a density of vehicles on particular roads of the street grid layout and an average speed of the vehicles on the particular roads of the street grid layout. In some embodiments, the associated vehicular traffic information includes a distribution of the density of the vehicles on the particular roads of the street grid layout and the average speed of the vehicles on the particular roads of the street grid layout over a particular time. In some embodiments, the average speed of the vehicles on the particular roads of the street grid layout is determined from motion-tracking data received from a plurality of computing devices that indicates a path a computing device travelled over a particular time.

In some embodiments, the plurality of potential street grids is received from a generative design system that creates each potential street grid based on geographic inputs for the location.

In some embodiments, the method further comprises determining a street grid modification to at least one street grid in the plurality of potential street grids based on the evaluation of the at least one street grid.

In some embodiments, the method further comprises automatically selecting a potential street grid from the plurality of potential street grids based on the evaluations using the trained pedestrian comfort model.

In accordance with some embodiments of the disclosed subject matter, a system for generating and evaluating street grids is provided, the system comprising a memory and a hardware processor that, when configured to execute computer executable instructions stored in the memory, is configured to: receive street grid information corresponding to a plurality of locations, wherein the street grid information corresponding to a location in the plurality of locations is associated with vehicular traffic information; train a pedestrian comfort model using the street grid information and the vehicular traffic information from each of the plurality of locations, wherein an output of the pedestrian comfort model is a predicted pedestrian comfort score that is based on traffic congestion from the vehicular traffic information; receive a plurality of potential street grids; evaluate each potential street grid in the plurality of potential street grids using the trained pedestrian comfort model, wherein the trained pedestrian comfort model generates predicted pedestrian comfort scores for portions of each potential street grid; and generate an augmented map of each potential street grid that presents the predicted pedestrian comfort scores for each portion of each potential street grid.

In accordance with some embodiments of the disclosed subject matter, a non-transitory computer-readable medium containing computer executable instructions that, when executed by a processor, cause the processor to perform a method for generating and evaluating street grids is provided, the method comprising: receiving, using a hardware processor, street grid information corresponding to a plurality of locations, wherein the street grid information corresponding to a location in the plurality of locations is associated with vehicular traffic information; training, using the hardware processor, a pedestrian comfort model using the street grid information and the vehicular traffic information from each of the plurality of locations, wherein an output of the pedestrian comfort model is a predicted pedestrian comfort score that is based on traffic congestion from the vehicular traffic information; receiving, using the hardware processor, a plurality of potential street grids; evaluating, using the hardware processor, each potential street grid in the plurality of potential street grids using the trained pedestrian comfort model, wherein the trained pedestrian comfort model generates predicted pedestrian comfort scores for portions of each potential street grid; and generating, using the hardware processor, an augmented map of each potential street grid that presents the predicted pedestrian comfort scores for each portion of each potential street grid.

In accordance with some embodiments of the disclosed subject matter, a system for generating and evaluating street grids is provided, the system comprising: means for receiving street grid information corresponding to a plurality of locations, wherein the street grid information corresponding to a location in the plurality of locations is associated with vehicular traffic information; means for training a pedestrian comfort model using the street grid information and the vehicular traffic information from each of the plurality of locations, wherein an output of the pedestrian comfort model is a predicted pedestrian comfort score that is based on traffic congestion from the vehicular traffic information; means for receiving a plurality of potential street grids; means for evaluating each potential street grid in the plurality of potential street grids using the trained pedestrian comfort model, wherein the trained pedestrian comfort model generates predicted pedestrian comfort scores for portions of each potential street grid; and means for generating an augmented map of each potential street grid that presents the predicted pedestrian comfort scores for each portion of each potential street grid.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
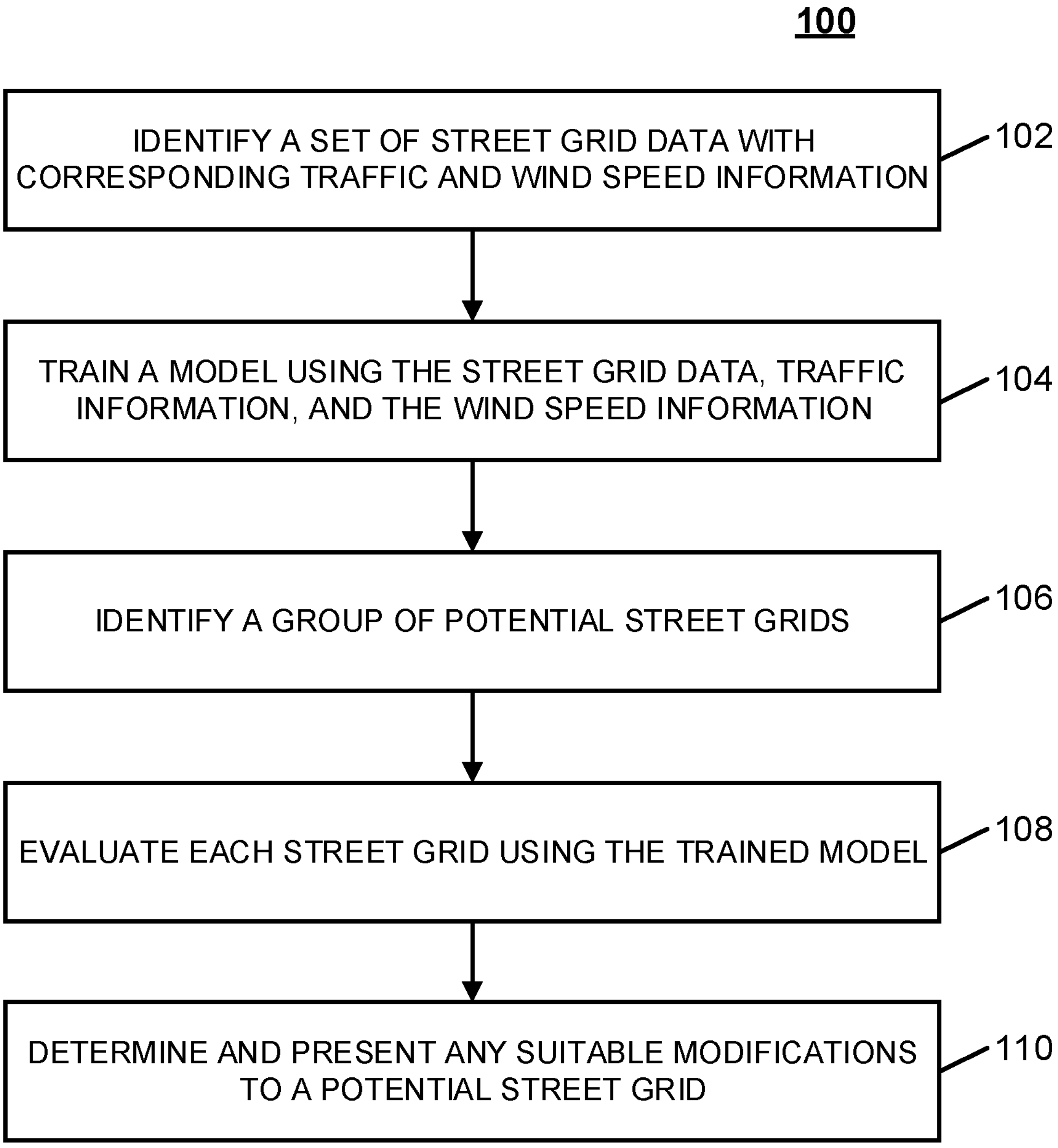
FIG. 1 shows an illustrative example of a process for generating and evaluating street grids in accordance with some embodiments of the disclosed subject matter.

In accordance with various embodiments, mechanisms (which can include methods, systems, and media) for generating and evaluating street grids are provided.

In some embodiments, the mechanisms described herein can be used to evaluate potential street grids for a city, town, or other location. In some embodiments, a street grid can include any suitable information, such as a layout of streets and/or roads within the city, town, or other location, a layout of buildings within the location corresponding to the street grid, and/or any other suitable information.

In some embodiments, the mechanisms can evaluate the potential street grids based on any suitable metrics. For example, in some embodiments, the mechanisms can predict a level of traffic congestion along streets and/or roads within the street grid. As another example, in some embodiments, the mechanisms can predict a level of pedestrian comfort for pedestrians walking along streets and/or roads of the street grid. As a more particular example, in some embodiments, the mechanisms can predict a level of pedestrian comfort by predicting a wind speed that would be experienced by pedestrians along different streets and/or roads of the street grid. As a specific example, in some embodiments, the mechanisms can assign a lower level of pedestrian comfort at locations within the street grid where predicted wind speed is relatively high (e.g., a wind speed that makes it hard for pedestrians to hear, a wind speed that makes walking unpleasant, and/or any other suitable relatively high wind speed).

In some embodiments, for each potential street grid, the mechanisms can create an augmented map that indicates the streets and/or roads of the street grid and buildings along the street grid in connection with predicted levels of traffic congestion and/or predicted levels of pedestrian comfort and/or any other suitable information that is predicted, inferred, measured, and/or retrieved from a database, a user interface, etc. In some such embodiments, the mechanisms can allow a user to view multiple potential street grids in connection with predicted levels of traffic congestion and/or predicted levels of pedestrian comfort, thereby allowing the user to determine tradeoffs experienced between vehicle traffic and pedestrians due to the layout of streets and buildings within the street grid. For example, in some embodiments, the mechanisms can generate two augmented maps, such as a first map that includes one or more winding streets with turns, and a second map that generally includes one or more long, straight streets. Continuing with this example, in some embodiments, the mechanisms can generate predicted levels of traffic congestion that indicate high levels of traffic congestion for the winding streets of the first map and low levels of traffic congestion for the long, straight streets of the second map. Continuing further with this example, the mechanisms can generate predicted levels of pedestrian comfort based on predicted wind speeds for each map that indicate low wind speeds, and correspondingly, high pedestrian comfort for the winding streets of the first map and high wind speeds and correspondingly, low pedestrian comfort for the long, straight streets of the second map. By presenting both the first map and the second map within a user interface, the mechanisms can allow a user of the user interface to view the tradeoffs between traffic congestion and pedestrian comfort that would result from choosing winding streets versus long, straight streets.

In some embodiments, the mechanisms can predict levels of traffic congestion and/or levels of wind speed in any suitable manner. For example, as described below in more detail in connection with FIG. 1, in some embodiments, the mechanisms can train a model based on training data from existing street grids and data collected that indicates levels of traffic congestion and/or wind speed measurements associated with the existing street grids. As a more particular example, in some embodiments, a model can take as inputs street grid data (e.g., locations and orientations of streets and/or roads, numbers of lanes for each street and/or road, speed limits on streets and/or roads, and/or any other suitable street grid information) and/or building information for buildings located within the area corresponding to the street grid (e.g., locations of buildings, heights of buildings, shapes of buildings, and/or any other suitable building information) and produce as outputs predicted traffic information (e.g., decreases in vehicle traffic relative to a speed limit for a particular street or portion of a street, and/or any other suitable traffic information) and/or predicted wind speed information (e.g., wind speeds and/or directions at a particular location within the street grid).

Note that a street grid as described herein can have any suitable shape. Additionally, note that, in some embodiments, a street grid can refer to any suitable layout of streets and other geographic landmarks, and is not limited to a rectangular pattern.

Turning to FIG. 1, an illustrative example 100 of a process for generating and evaluating street grids is shown in accordance with some embodiments of the disclosed subject matter. In some embodiments, process 100 can be executed by any suitable device, such as a server that stores information related to street grids, traffic, wind speed, and/or any other suitable information, and/or any other suitable device.

Process 100 can begin by identifying a set of street grid data with corresponding traffic and wind speed information. Note that, in some embodiments, the street grid data can correspond to inputs of a training set for a model to predict traffic and wind speed information from street grid data, as described below in connection with block 104. In some such embodiments, the traffic and wind speed information can correspond to outputs of the training set for the model. Additionally, note that, in some embodiments, the street grid data and the traffic and wind speed information can correspond to streets and/or roads that currently exist in any suitable location(s). For example, in some embodiments, the street grid data can correspond to a street grid of an existing city. Continuing with this example, in some embodiments, the traffic and/or wind speed information can correspond to any suitable traffic and/or wind speed measurements collected from within the city.

In some embodiments, the street grid data can include any suitable information, such as locations of streets, names of streets, directions that vehicles are allowed to drive on for each street or portion of a street, speed limits along different portions streets, whether there is a sidewalk on each side of a street, locations of speed bumps, and/or any other suitable information. In some embodiments, the street grid data can additionally include building information that indicates any suitable information about buildings on streets or roads included in the street grid data. For example, in some embodiments, the building information can include addresses of buildings, heights or other size information of buildings, shapes of buildings, purposes of buildings (e.g., whether a building is a residential building, a commercial building, a mixed-use building, etc.), and/or any other suitable information.

In some embodiments, the traffic information can include any suitable information related to traffic on streets and/or roads included in the street grid data. For example, in some embodiments, the traffic information can include a density of vehicles on particular streets and/or roads (e.g., a number of cars passing through a particular intersection over any suitable period of time). As another example, in some embodiments, the traffic information can indicate an average speed of vehicles on a particular street at a particular time (e.g., at 5 p.m., at rush hour, and/or at any other suitable time) relative to a speed limit or an average speed of vehicles on the street at a different time (e.g., on a weekend morning, at 10 a.m., and/or at any other suitable time). As a more particular example, in some embodiments, the traffic information can indicate that there is a 25% reduction in average speed of vehicles on Mondays at 5 p.m. on a particular portion of a street relative to the average speed of vehicles on the same portion of the street on Saturdays at 8 a.m.

In some embodiments, the wind speed information can include any suitable information. For example, in some embodiments, the wind speed information can include information indicating wind speeds and/or directions at particular locations. In some embodiments, wind speeds and/or directions can be indicated in connection with a date and/or a time at which a wind speed and/or direction was measured. Note that, in some embodiments, a wind speed measurement can be a measured wind speed at a particular height or elevation.

Note that, in some embodiments, location information for a particular traffic measurement and/or a particular wind speed measurement can be indicated in any suitable manner. For example, in some embodiments, location information can be indicated as Global Positioning System (GPS) coordinates corresponding to a location at which a traffic measurement or wind speed measurement was collected. As another example, in some embodiments, location information can be indicated as an address (e.g., a street number and/or a street name). As yet another example, in some embodiments, location information can be indicated using two or more streets that make up an intersection. Additionally, note that, in some embodiments, location information can include a three-dimensional coordinate.

Additionally, note that, in some embodiments, any other suitable data or information related to a street grid can be received by process 100 at 102. For example, in some embodiments, process 100 can receive data that indicates driver behavior at different times and/or at different locations within the street grid. As a more particular example, in some embodiments, the driver behavior data can indicate locations or times of day drivers tend to drive above a posted speed limit, locations or times of day drivers tend to run red lights, locations or times of day drivers tend to receive tickets or other citations, and/or any other suitable driver behavior data.

In some embodiments, process 100 can receive the street grid data, the traffic information, wind speed information, and/or any other suitable data or information from any suitable source. For example, in some embodiments, data and/or information can be received from a government entity that collects and/or maintains data such as traffic on particular roads, weather information, etc. Note that, in some embodiments, the street grid data, the traffic information, the wind speed information, and/or any other suitable data or information can each be received from a different source. For example, in some embodiments, street grid data can be received from a government entity or other source that maintains data or information on street layouts and/or geographic landmarks for a particular geographic location. As another example, in some embodiments, traffic information can be received from one or more sensors that measure different types of traffic (e.g., vehicular traffic, pedestrian traffic, and/or any other suitable type of traffic) at different locations. As yet another example, in some embodiments, wind speed information can be received from one or more sensors that measure wind speeds from different locations associated with a placement of each sensor. Note that, in some embodiments, any suitable information can be retrieved from a database that collects the information from any suitable source and stores the information. For example, in some embodiments, wind speed information can be retrieved from a weather-related database that collects weather-related data from any suitable sensors and stores the collected data.

Note that, in some embodiments, process 100 can receive data that can be used to infer traffic information, wind speed information, and/or any other suitable information from any suitable source. For example, in some embodiments, process 100 can receive motion-tracking data from a user device that indicates a path the user device traveled over a particular period of time, and can determine a relative speed based on the motion-tracking data. Continuing with this example, in some embodiments, process 100 can receive motion-tracking data from multiple user devices and/or from multiple vehicles, and can infer an average traveling speed for a particular type of vehicle on a particular street or portion of a street. In some embodiments, process 100 can then compare a determined average traveling speed with a known speed limit to determine traffic information for the particular street or portion of the street. In some embodiments, process 100 can receive data that can be used to infer traffic information, wind speed information, and/or any other suitable information from any suitable sensors or other sources, such as from accelerometers or GPS systems on individual user devices or vehicles, from any suitable weather stations within a general geographic location, and/or from any other suitable source(s).

At 104, process 100 can train a model using the street grid data, the traffic information, and/or the wind speed information. In some embodiments, process 100 can train the model using any suitable technique or combination of techniques. Additionally, note that, in some embodiments, the model can include any suitable type of algorithm(s), such as any suitable type of machine learning model, and/or any other suitable type of algorithm(s). In some embodiments, process 100 can train the model using the street grid data, the traffic information, and/or the wind speed information in any suitable manner. For example, in some embodiments, process 100 can generate a training set that includes any suitable number of training samples (e.g., one hundred, one thousand, ten thousand, one million, and/or any other suitable number) from the street grid data, the traffic information, and/or the wind speed information. As a more particular example, in some embodiments, process 100 can generate a training set in which each training sample includes a location from the street grid (e.g., GPS coordinate, an address, an intersection, and/or any other suitable location), street information corresponding to the location (e.g., speed limits at the location, direction of traffic flow, a number of traffic lanes at the location, and/or any other suitable street information), building information corresponding to the location (e.g., a type of building located at the location, a height of a building located at the location, a shape of the building located at the location, and/or any other suitable building information), traffic information measured at the location (e.g., a density of vehicles at a particular time, a reduction in vehicle speed at a particular time relative to a speed limit or an average vehicle speed at a different time, and/or any other suitable traffic information), and/or wind speed information (e.g., a wind speed measured at the location at a particular time, a wind direction measured at the location at a particular time, and/or any other suitable wind speed information).

Note that, in some embodiments, street information (e.g., locations of streets, speed limits on streets, and/or any other suitable street information) and/or building information (e.g., a location of a building, a type of activity associated with a building, a height of a building, a shape of a building, and/or any other suitable building information) can correspond to inputs of each training sample. In some embodiments, traffic information and wind speed information can correspond to outputs of each training sample. Additionally, note that, in some embodiments, a training sample may include traffic measurements and/or wind speed measurements that have been measured within a predetermined distance (e.g., within one block, within 0.1 miles, and/or within any other suitable distance) of a particular location (e.g., a location at which a building indicated in a training sample is located, and/or any other suitable location). That is, in some embodiments, a traffic measurement and/or a measured wind speed may not match an exact location of the street grid data, but instead may be measurements collected from nearby measurement locations that satisfy any suitable criteria (e.g., within a predetermined distance) indicating that the traffic measurement and/or the wind speed measurement are close enough to a particular location.

Note that, in some embodiments, the model can include any suitable type of algorithm(s). For example, in some embodiments, process 100 can train a neural network with any suitable number of layers. Note that in some embodiments, process 100 can train the model using a subset of the training samples (e.g., 70% of the training samples, 80% of the training samples, and/or any other suitable subset). In some such embodiments, process 100 can then test a trained model using a remaining portion of the training samples to determine an accuracy of the trained model. As another example, in some embodiments, process 100 can use any suitable type of model that incorporates Computational Fluid Dynamics (CFD) to perform any suitable function(s), such as model the wind speed information based on any suitable factors, such as traffic, street layout, etc. As a more particular example, in some embodiments, process 100 can train any suitable machine learning algorithm that approximates a CFD model or a result of a CFD model, thereby allowing process 100 to access a result of a CFD model without running a full, computationally-intensive CFD simulation.

At 106, process 100 can identify a group of potential street grids. In some embodiments, any suitable number of street grids can be included in the group of potential street grids (e.g., one, two, five, ten, twenty, one hundred, and/or any other suitable number). In some embodiments, a street grid can include any suitable information. For example, in some embodiments, a street grid can include indications of streets and roads that connect any suitable points within the grid. As another example, in some embodiments, the street grid can include information indicating a number of lanes of each street or road. As yet another example, in some embodiments, the street grid can include information indicating speed limits for different portions of streets or roads. As still another example, in some embodiments, the street grid can include building information, such as locations of buildings within the street grid, types of activities associated with particular buildings (e.g., that a particular building is an apartment complex, that a particular building is a factory, that a particular building is a mixed-use building that includes residential units as well as retail units, and/or any other suitable activity information), heights of buildings within the street grid, shapes of buildings within the street grid, and/or any other suitable building information.

In some embodiments, process 100 can identify the group of potential street grids in any suitable manner. For example, in some embodiments, process 100 can receive the group of potential street grids from any suitable source that previously generated the group of potential street grids in any suitable manner and using any suitable technique(s). As another example, in some embodiments, process 100 can generate street grids included in the group of potential street grids. In some such embodiments, process 100 can generate each street grid within the group of potential street grids using any suitable technique or combination of techniques. For example, in some embodiments, process 100 can generate a potential street grid using an algorithm that takes as inputs geographic information for a location associated with the street grid (e.g., locations of natural landmarks such as rivers, mountains, etc., a shape of a parcel of land associated with the street grid, and/or any other suitable geographic information), any suitable fixed points within the street grid (e.g., that a park is to be located at a particular location, etc.), and/or any other suitable inputs, and that produces as an output a grid of streets and/or roads based on the inputs.

At 108, process 100 can evaluate each street grid using the trained model. In some embodiments, evaluating a street grid can include predicting any suitable information associated with the street grid. For example, in some embodiments, process 100 can predict traffic information and wind speed information using the trained model described above in connection with block 104. In some embodiments, process 100 can predict the traffic information and the wind speed information using the trained model in any suitable manner. For example, in some embodiments, process 100 can provide any suitable street grid and/or building information as inputs to the model, and the model can determine traffic information and wind speed information for locations of the street grid as outputs. As a more particular example, in some embodiments, process 100 can provide as an input a layout of streets and/or roads within the street grid, speed limit information for different portions of streets and/or roads, locations and types of buildings, locations of sidewalks, and/or any other suitable input information. In some embodiments, the output of the model can include predicted traffic information and/or predicted wind speeds at different locations within the street grid. For example, in some embodiments, the output can indicate that a particular location (e.g., indicated using GPS coordinates, indicated using an intersection, indicated using a street address, and/or any other suitable location) is predicted to have a particular wind speed due to traffic. As another example, in some embodiments, the output can indicate that vehicles at a particular location are predicted to slow down relative to a speed limit for the location at a particular time of day.

In some embodiments, process 100 can format model outputs in any suitable manner. For example, in some embodiments, process 100 can generate an augmented map of a street grid based on predicted traffic information and/or predicted wind speed information. As a more particular example, in some embodiments, process 100 can color streets based on predicted traffic information. As a specific example, in instances in which the traffic information indicates more than a predetermined amount of traffic congestion (e.g., more than a 50% slow-down of vehicles at any time of day, and/or any other suitable amount), process 100 can color a corresponding portion of a street red to indicate high traffic congestion. As another specific example, in instances in which the model predicts no slowdown in vehicles for a particular street or road or a portion of a street or road, process 100 can color the street green to indicate low traffic congestion.

As another more particular example, in some embodiments, process 100 can determine a level of pedestrian comfort based on predicted wind speed information. As a specific example, in some embodiments, process 100 can assign a score indicating high pedestrian comfort at locations within the street grid where a predicted wind speed is relatively low (e.g., below any suitable predetermined threshold). As another specific example, in some embodiments, process 100 can assign a score indicating low pedestrian comfort at locations within the street grid where a predicted wind speed is relatively high (e.g., above any suitable predetermined threshold). In some such embodiments, process 100 can indicate pedestrian comfort level in any suitable manner. For example, in some embodiments, process 100 can generate an augmented map of the street grid to indicate predicted pedestrian comfort levels in any suitable visual manner (e.g., by shading roads with high predicted comfort levels, by shading roads with low predicted comfort levels, and/or in any other suitable manner).

In some embodiments, process 100 can cause an augmented map of a street grid (e.g., a map that indicates locations of streets and buildings as well as predicted traffic information, predicted wind speed information, and/or predicted pedestrian comfort levels at locations within the street grid) to be presented in any suitable manner. For example, in some embodiments, process 100 can cause an augmented map of a street grid to be presented within a user interface. In some embodiments, in instances where process 100 evaluates more than one potential street grid at 108, process 100 can present augmented maps corresponding to each evaluated street grid. For example, in some embodiments, the multiple augmented maps can be presented within a user interface that allows a user of the user interface to scroll through the multiple augmented maps.

At 110, process 100 can determine and present any suitable modifications to a potential street grid in the group of potential street grids. In some embodiments, a modification to a street grid can include any suitable modification. For example, in some embodiments, a modification to a street grid can include a modification to a flow of traffic on one or more streets included in the street layout of the street grid. As a more particular example, in some embodiments, a modification to a flow of traffic can include a recommendation that a particular street be made one-way to vehicular traffic. As another more particular example, in some embodiments, a modification to a flow of traffic can include a recommendation that a particular street include a dedicated bike lane. As another example, in some embodiments, a modification to a street grid can include a modification to infrastructure that controls traffic flow. As a more particular example, in some embodiments, a modification to infrastructure that controls traffic flow can include a recommendation that a speed bump be placed at a particular location of a particular street. As another more particular example, in some embodiments, a modification to infrastructure that controls traffic flow can include a recommendation that a stoplight be placed at a particular intersection.

In some embodiments, process 100 can determine the modifications to a potential street grid in any suitable manner. For example, in some embodiments, process 100 can identify a location in the potential street grid that includes a prediction of traffic congestion. As a more particular example, in some embodiments, process 100 can identify a particular portion of a street that has been predicted as described above in connection with block 108 as likely to experience a relative slowdown of vehicular traffic. Continuing with this example, in some embodiments, process 100 can then determine one or more modifications that can be applied to the street grid, such as making the street or an adjacent street one-way, adding a traffic light to a particular nearby intersection, and/or any other suitable modification. In some embodiments, process 100 can then loop back to block 108 and can re-evaluate the street grid with the determined modification to identify any changes in predicted traffic, predicted wind speeds, and/or any other suitable predicted metrics with the inclusion of the modification to the street grid.

Note that, in some embodiments, process 100 can present modifications to a potential street grid in any suitable manner. For example, in some embodiments, process 100 can present a user interface that includes a recommendation for the modification in connection with a recommended location for the modification. As a more particular example, in an instance in which a modification to a potential street grid is a recommendation to place a traffic light at a particular intersection, in some embodiments, process 100 can present the potential street grid with an indicator of the intersection and/or any suitable message that recommends a traffic light be placed at the intersection.

In some embodiments, process 100 can obtain needed information for optimization of user decisions, such as street grid design. For example, process 100 can select one or more street grids from the group of potential street grids for recommendation based on the competing requirements of pedestrian comfort based on predicted wind speed information and traffic congestion based on predicted traffic information associated with each street grid. determined level of pedestrian comfort (from the predicted wind speed information) and based on predicted traffic information.

It should be noted that, in some embodiments, process 100 can receive information about street grid design needs and preferences to adjust one or more objective functions. For example, process 100 can present an interface for inputting information, such as a required building height of a particular area, a required speed limit of a particular area, etc.

Process 100 can then, for example, evaluate the two objectives of pedestrian comfort based on predicted wind speed information and traffic congestion based on predicted traffic information associated with each street grid and can determine the Pareto frontier or surface (or relative weighting of the multi-objective optimization variables) specifying combinations of tradeoffs between the two objectives. As a result, process 100 can generate a set of Pareto optimal solutions indicating a set of solutions optimally satisfying the two conflicting objectives of pedestrian comfort and traffic congestion, among which neither of the two objectives can be improved in value without degrading the other objective values.

In continuing this example, process 100 can select a street grid design being deemed as a Pareto optimal solution from the group of potential street grids.

For example, upon using a modeling application to generate thousands of potential street grid layouts, process 100 can select one or more street grid designs that are deemed to be Pareto optimal solutions for the two conflicting objectives of pedestrian comfort and traffic congestion.

Note that, in some embodiments, an analysis by process 100 can be used to generate a street grid. For example, in some embodiments, process 100 can generate a street grid with multiple streets that includes any suitable combination of long and/or straight streets and winding streets (e.g., having one or more turns) to maximize any suitable objectives. As a more particular example, in some embodiments, process 100 can generate a street grid that includes any suitable combination of long and/or straight streets and winding streets that minimizes traffic congestions in some portions of the street grid while maximizing pedestrian comfort in other portions of the street grid.

Additionally, note that, in some embodiments, the mechanisms described herein can be used to guide a system in the generation of one or more street grids, evaluation of the one or more street grids, and selection of one of the street grids based on the evaluation. For example, in some embodiments, process 100 can generate the street grid using any suitable technique or combination of techniques. For example, in some embodiments, process 100 can generate multiple street grids (e.g., one hundred street grids, one thousand street grids, ten thousand street grids, and/or any other suitable number) that link any suitable number of points located within the street grid. In some embodiments, streets included in each of the multiple street grids can be of any suitable type (e.g., long, straight, winding, and/or any other suitable type). In some embodiments, process 100 can then evaluate each street grid based on any suitable factors. For example, in some embodiments, process 100 can use the techniques described above to calculate an aggregate score indicating traffic congestion for each street grid and/or an aggregate score indicating pedestrian comfort for each street grid. As another example, in some embodiments, process 100 can use the techniques described above to calculate scores indicating traffic congestion and/or pedestrian comfort for portions of each street grid. In some embodiments, process 100 can then select a street grid of the multiple street grids based on the calculated traffic congestion scores and/or the calculated pedestrian comfort scores. In some embodiments, process 100 can use any suitable machine learning algorithms to combine portions of the multiple street grids to generate a new street grid. For example, in some embodiments, process 100 can combine a first portion of a first street grid that spans a first area that maximizes pedestrian comfort within the first area with a second portion of a second street grid that spans a second area that minimizes traffic congestion within the second area.

In some embodiments, any of the techniques and/or algorithm(s) described herein can be used to allow an entity to evaluate potential modifications to an existing street grid to further optimize traffic, pedestrian comfort, and/or any other suitable metric. For example, in some embodiments, an existing street grid for any suitable city, town, or other location can be used as an input to the trained model described above in connection with blocks 104 and/or 108. In some embodiments, the model can additionally take, as inputs, any suitable group of proposed modifications to the existing street grid. For example, in some embodiments, the proposed modifications can include changes in speed limit on one or more streets of the street grid, changes in traffic flow on one or more streets of the street grid (e.g., making a street one-way, adding a speed bump at a particular location, adding a traffic light or a stop sign at a particular location, and/or any other suitable changes in traffic flow), adding one or more bike lanes in particular locations, widening or narrowing particular streets, and/or any other suitable modification. Continuing with this example, in some embodiments, the mechanisms described herein can then generate and present any suitable outputs indicating results of each of the proposed modifications to the street grid. For example, in some embodiments, the mechanisms can generate an augmented street grid map for each proposed modification that indicates a result of the proposed modification. As a more particular example, in some embodiments, an augmented street grid map can indicate that widening a particular lane of traffic of a street can reduce traffic congestion on the street and/or any other nearby streets by coloring or shading the affected streets in a manner that indicates the predicted reduced traffic congestion.

Note that, in some embodiments, proposed modifications can be determined in any suitable manner. For example, in some embodiments, proposed modifications can be generated and input to a trained model manually. As another example, in some embodiments, proposed modifications can be generated algorithmically in any suitable manner. As a more particular example, in some embodiments, the mechanisms described herein can identify any suitable measurements that disagree with a predicted metric, and can use any suitable type of algorithm that generates a test or an experiment based on a mismatch between a measurement and a predicted measurement. As a specific example, in an instance in which an evaluation of a particular existing street grid indicates that a predicted low-level of traffic congestion at a particular intersection and in which measured data (e.g., measured traffic data, measured motion-tracking data, and/or any other suitable data) indicate there is a relatively high-level of traffic congestion at the intersection, the mechanisms can generate a test or an experiment to the street grid to determine a modification that can be made to improve the traffic congestion at the street grid. Continuing with this example, in some embodiments, generated tests or experiments can include any suitable proposed modifications to the existing street grid, such as widening lanes of traffic near the area of traffic congestion, increasing green light durations at particular stop lights near the area of traffic congestion, and/or any other suitable proposed modifications.

Note that, in some embodiments, a generated test or experiment can include any suitable modification to a street grid, as described above. In some embodiments, any suitable type of coevolutionary algorithm or active learning algorithm can be used to generate informative tests or experiments. Note that, in some embodiments, any suitable measured data can be used to algorithmically generate proposed modifications to a street grid. For example, in some embodiments, the measured data can include traffic flow data and/or wind speed information, as described above. As another example, in some embodiments, the measured data can include driver behavior, such as locations where drivers tend to drive above or below a posted speed limit, locations where drivers tend to run red lights, locations where drivers tend to get tickets or other citations, and/or any other suitable driver behavior data. In some embodiments, by algorithmically generating tests or experiments that can be used to evaluate proposed modifications to existing street grids, the mechanisms described herein can allow a city or other locale to evaluate potential changes to a street grid in a relatively low-cost manner.

Figure 2:
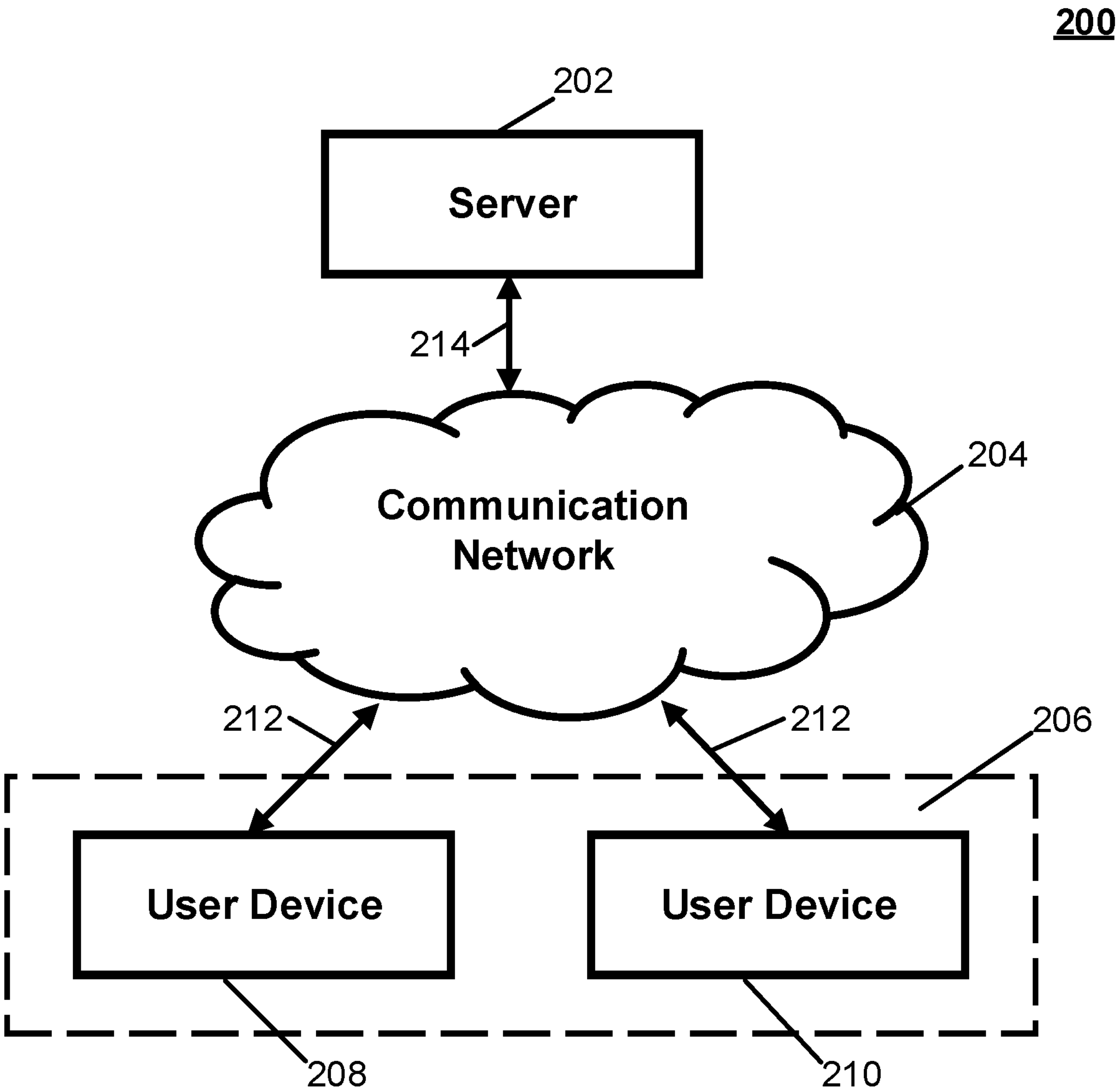
FIG. 2 shows a schematic diagram of an illustrative system suitable for implementation of mechanisms described herein for identifying tradeoffs between outcome variables in accordance with some embodiments of the disclosed subject matter.

Turning to FIG. 2, an example 200 of hardware for generating and evaluating street grids that can be used in accordance with some embodiments of the disclosed subject matter is shown. As illustrated, hardware 200 can include a server 202, a communication network 204, and/or one or more user devices 206, such as user devices 208 and 210.

Server 202 can be any suitable server(s) for storing information, data, programs, and/or any other suitable content. For example, in some embodiments, server 202 can store any suitable data related to street grids, locations of buildings within a street grid, traffic data, wind speed data, and/or any other suitable type of data. As another example, in some embodiments, server 202 can perform any suitable technique or combination of techniques to train a model using street grid data, traffic data, and/or wind speed data, as described above in connection with block 104 of FIG. 4. As yet another example, in some embodiments, server 202 can perform any suitable technique or combination of techniques to evaluate a particular street grid. As a more particular example, in some embodiments, server 202 can predict traffic information, wind speed information, and/or any other suitable information for a street grid using a trained model, as described above in connection with block 108 of FIG. 4.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links (e.g., communications links 212) to communication network 204 that can be linked via one or more communications links (e.g., communications links 214) to server 202. The communications links can be any communications links suitable for communicating data among user devices 206 and server 202 such as network links, dial-up links, wireless links, hard-wired links, any other suitable communications links, or any suitable combination of such links.

User devices 206 can include any one or more user devices suitable for collecting information and/or data, storing information and/or data, and/or transmitting information and/or data to server(s) 202. For example, in some embodiments, user devices 206 can collect, store, and/or transmit any suitable information, such as information related to traffic (e.g., a speed at which user device 206 is moving, a position of user device 206, and/or any other suitable information), and/or any other suitable information as described above in connection with FIG. 1. In some embodiments, user devices 206 can include any suitable type(s) of user devices. For example, in some embodiments, user devices 206 can include a mobile phone, a tablet computer, a media player, a desktop computer, a laptop computer, a television, a game console, a vehicle information or entertainment system, a wearable computer, and/or any other suitable type of user device.

Although server 202 is illustrated as one device, the functions performed by server 202 can be performed using any suitable number of devices in some embodiments. For example, in some embodiments, multiple devices can be used to implement the functions performed by server 202.

Although two user devices 208 and 210 are shown in FIG. 2 to avoid over-complicating the figure, any suitable number of user devices, and/or any suitable types of user devices, can be used in some embodiments.

Figure 3:
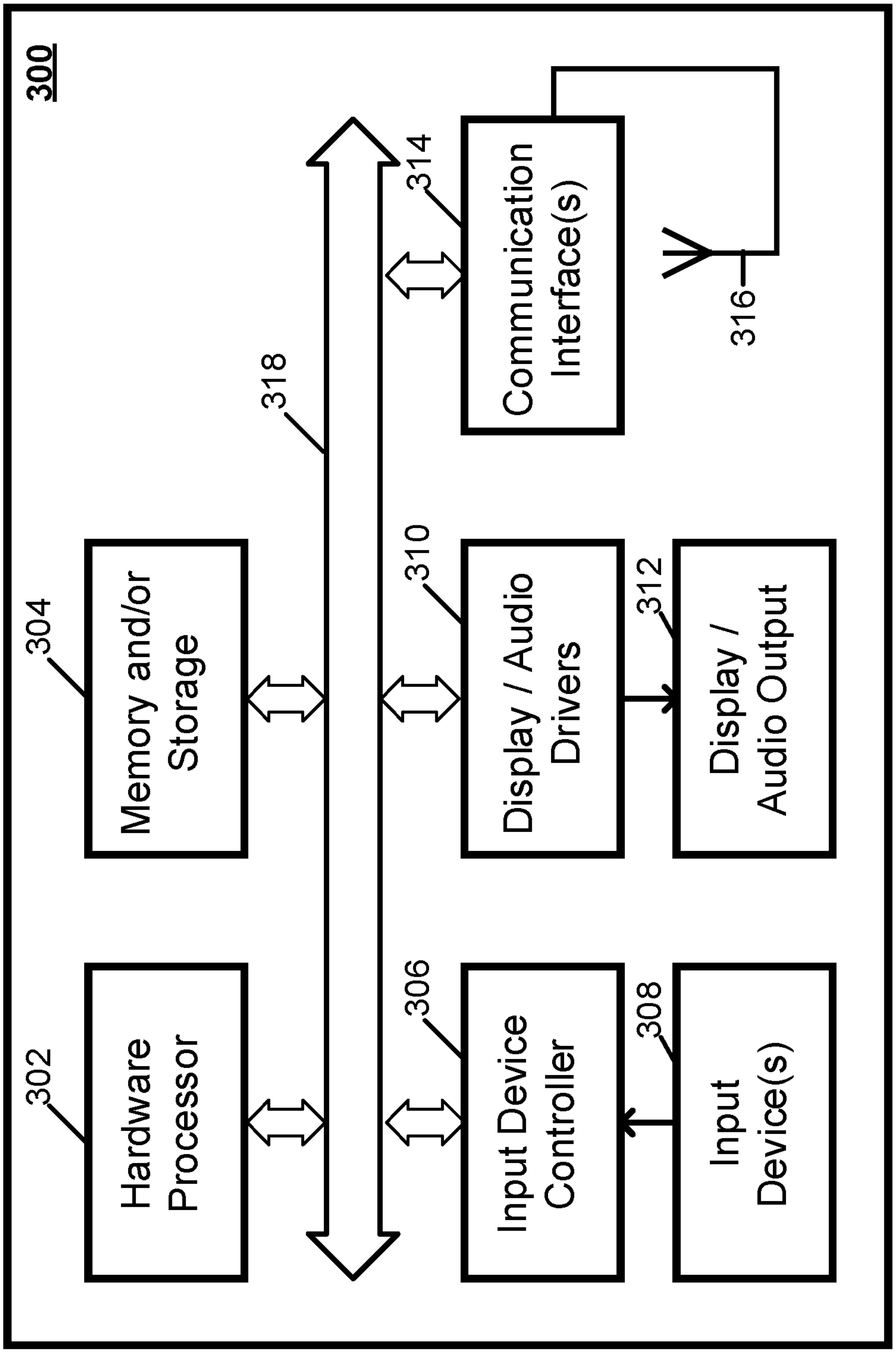
FIG. 3 shows a detailed example of hardware that can be used in a server and/or a user device of FIG. 2 in accordance with some embodiments of the disclosed subject matter.

Server 202 and user devices 206 can be implemented using any suitable hardware in some embodiments. For example, in some embodiments, devices 202 and 206 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 302 can be controlled by a server program stored in memory and/or storage of a server, such as server 302. For example, in some embodiments, the server program can cause hardware processor 302 to train a model based on street grid data, wind speed data, and/or traffic data, evaluate a particular street grid to predict traffic information and/or wind speed information, and/or perform any other suitable functions.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks (e.g., computer network 204). For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 200 in accordance with some embodiments.

In some embodiments, at least some of the above described blocks of the process of FIG. 1 can be executed or performed in any order or sequence not limited to the order and sequence shown in and described in connection with the figures. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for generating and evaluating street grids are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for generating and evaluating street grids, the method comprising:

receiving, using a hardware processor, street grid information corresponding to a plurality of locations, wherein the street grid information corresponding to a location in the plurality of locations is associated with vehicular traffic information;

training, using the hardware processor, a pedestrian comfort model using the street grid information and the vehicular traffic information from each of the plurality of locations, wherein an output of the pedestrian comfort model is a predicted pedestrian comfort score that is based on traffic congestion from the vehicular traffic information;

receiving, using the hardware processor, a plurality of potential street grids;

evaluating, using the hardware processor, each potential street grid in the plurality of potential street grids using the trained pedestrian comfort model, wherein the trained pedestrian comfort model generates predicted pedestrian comfort scores for portions of each potential street grid;

generating an interactive augmented map of each potential street grid that presents, upon receiving a selection of a portion of a potential street grid, the predicted pedestrian comfort scores for the selected portion; and providing, using the hardware processor, the interactive augmented map to a user device.

2. The method of claim 1, wherein the street grid information corresponds with a street grid layout and wherein the associated vehicular traffic information includes a density of vehicles on particular roads of the street grid layout and an average speed of the vehicles on the particular roads of the street grid layout.

3. The method of claim 2, wherein the associated vehicular traffic information includes a distribution of the density of the vehicles on the particular roads of the street grid layout and the average speed of the vehicles on the particular roads of the street grid layout over a particular time.

4. The method of claim 2, wherein the average speed of the vehicles on the particular roads of the street grid layout is determined from motion-tracking data received from a plurality of computing devices that indicates a path travelled by one or more of the plurality of computing devices.

5. The method of claim 1, wherein the plurality of potential street grids is received from a generative design system that creates each potential street grid based on geographic inputs for the location.

6. The method of claim 1, further comprising determining a street grid modification to at least one street grid in the plurality of potential street grids based on the evaluation of the at least one street grid.

7. The method of claim 1, further comprising automatically selecting a potential street grid from the plurality of potential street grids based on the evaluations using the trained pedestrian comfort model.

8. A system for generating and evaluating street grids, the system comprising:

a memory; and a hardware processor that, when configured to execute computer executable instructions stored in the memory, is configured to:

receive street grid information corresponding to a plurality of locations, wherein the street grid information corresponding to a location in the plurality of locations is associated with vehicular traffic information;

train a pedestrian comfort model using the street grid information and the vehicular traffic information from each of the plurality of locations, wherein an output of the pedestrian comfort model is a predicted pedestrian comfort score that is based on traffic congestion from the vehicular traffic information;

receive a plurality of potential street grids;

evaluate each potential street grid in the plurality of potential street grids using the trained pedestrian comfort model, wherein the trained pedestrian comfort model generates predicted pedestrian comfort scores for portions of each potential street grid;

generate an interactive augmented map of each potential street grid that presents, upon receiving a selection of a portion of a potential street grid, the predicted pedestrian comfort scores for the selected portion; and provide, using the hardware processor, the interactive augmented map to a user device.

9. The system of claim 8, wherein the street grid information corresponds with a street grid layout and wherein the associated vehicular traffic information includes a density of vehicles on particular roads of the street grid layout and an average speed of the vehicles on the particular roads of the street grid layout.

10. The system of claim 9, wherein the associated vehicular traffic information includes a distribution of the density of the vehicles on the particular roads of the street grid layout and the average speed of the vehicles on the particular roads of the street grid layout over a particular time.

11. The system of claim 9, wherein the average speed of the vehicles on the particular roads of the street grid layout is determined from motion-tracking data received from a plurality of computing devices that indicates a path travelled by one or more of the plurality of computing devices.

12. The system of claim 8, wherein the plurality of potential street grids is received from a generative design system that creates each potential street grid based on geographic inputs for the location.

13. The system of claim 8, wherein the hardware processor is further configured to determine a street grid modification to at least one street grid in the plurality of potential street grids based on the evaluation of the at least one street grid.

14. The system of claim 8, wherein the hardware processor is further configured to automatically select a potential street grid from the plurality of potential street grids based on the evaluations using the trained pedestrian comfort model.

15. A non-transitory computer-readable medium containing computer executable instructions that, when executed by a processor, cause the processor to perform a method for generating and evaluating street grids, the method comprising:

receiving street grid information corresponding to a plurality of locations, wherein the street grid information corresponding to a location in the plurality of locations is associated with vehicular traffic information;

training a pedestrian comfort model using the street grid information and the vehicular traffic information from each of the plurality of locations, wherein an output of the pedestrian comfort model is a predicted pedestrian comfort score that is based on traffic congestion from the vehicular traffic information;

receiving, a plurality of potential street grids;

evaluating, each potential street grid in the plurality of potential street grids using the trained pedestrian comfort model, wherein the trained pedestrian comfort model generates predicted pedestrian comfort scores for portions of each potential street grid; and generating an interactive augmented map of each potential street grid that presents, upon receiving a selection of a portion of a potential street grid, the predicted pedestrian comfort scores for the selected portion; and providing the interactive augmented map to a user device.

16. The non-transitory computer-readable medium of claim 15, wherein the street grid information corresponds with a street grid layout and wherein the associated vehicular traffic information includes a density of vehicles on particular roads of the street grid layout and an average speed of the vehicles on the particular roads of the street grid layout.

17. The non-transitory computer-readable medium of claim 16, wherein the associated vehicular traffic information includes a distribution of the density of the vehicles on the particular roads of the street grid layout and the average speed of the vehicles on the particular roads of the street grid layout over a particular time.

18. The non-transitory computer-readable medium of claim 16, wherein the average speed of the vehicles on the particular roads of the street grid layout is determined from motion-tracking data received from a plurality of computing devices that indicates a path travelled by one or more of the plurality of computing devices.

19. The non-transitory computer-readable medium of claim 15, wherein the plurality of potential street grids is received from a generative design system that creates each potential street grid based on geographic inputs for the location.

20. The non-transitory computer-readable medium of claim 15, wherein the method further comprises determining a street grid modification to at least one street grid in the plurality of potential street grids based on the evaluation of the at least one street grid.

21. The non-transitory computer-readable medium of claim 15, wherein the method further comprises automatically selecting a potential street grid from the plurality of potential street grids based on the evaluations using the trained pedestrian comfort model.

* * * * *